United States Patent
McFadyen et al.

(10) Patent No.: US 11,737,194 B2
(45) Date of Patent: Aug. 22, 2023

(54) LIGHT SWITCH SYSTEM

(71) Applicant: ECOBEE INC., Toronto (CA)

(72) Inventors: Stephen B. E. McFadyen, Toronto (CA); Houston Keil-Vine, Toronto (CA)

(73) Assignee: GENERAC POWER SYSTEMS, INC., Waukesha, WI (US)

( * ) Notice: Subject to any disclaimer, the term of this patent is extended or adjusted under 35 U.S.C. 154(b) by 287 days.

(21) Appl. No.: 17/014,582

(22) Filed: Sep. 8, 2020

(65) Prior Publication Data

US 2021/0076469 A1  Mar. 11, 2021

Related U.S. Application Data

(60) Provisional application No. 62/897,466, filed on Sep. 9, 2019.

(51) Int. Cl.
*H05B 47/13* (2020.01)
*H05B 45/10* (2020.01)
*H05B 47/19* (2020.01)

(52) U.S. Cl.
CPC ............. *H05B 47/13* (2020.01); *H05B 45/10* (2020.01); *H05B 47/19* (2020.01)

(58) Field of Classification Search
CPC .............................. H05B 47/13; H05B 47/115
See application file for complete search history.

(56) References Cited

U.S. PATENT DOCUMENTS

| | | | |
|---|---|---|---|
| 8,729,729 B2* | 5/2014 | Fridberg | H02J 1/14 315/307 |
| 2012/0235579 A1* | 9/2012 | Chemel | F21V 29/60 315/152 |
| 2016/0192458 A1 | 6/2016 | Keith | |
| 2020/0163186 A1* | 5/2020 | Poojary | H02J 7/0068 |

FOREIGN PATENT DOCUMENTS

CA         3007998 A1     6/2017

\* cited by examiner

*Primary Examiner* — Alexander H Taningco
*Assistant Examiner* — Pedro C Fernandez
(74) *Attorney, Agent, or Firm* — Perry + Currier Inc.

(57) ABSTRACT

There is provided a light switch system having a housing and a controller secured to the housing. The controller is to control a light source to generate a light output based on a demanded output. The light source is to illuminate at least a portion of an operational volume. The light switch system also has an occupancy sensor communicatively coupled to the controller. The occupancy sensor is to generate an occupancy indicator to indicate whether the operational volume is occupied. Moreover, the light switch system has a functional module communicatively coupled to the controller. In addition, the controller is to divert power from the light source to the functional module by controlling the light source to a the light output to produce an altered light output based on the occupancy indicator.

15 Claims, 9 Drawing Sheets

LIGHT SWITCH SYSTEM

CROSS-REFERENCE TO RELATED APPLICATIONS

This application claims the benefit of and/or priority to U.S. Provisional Application Ser. No. 62/897,466, filed Sep. 9, 2019, the entire contents of which are incorporated herein by reference.

FIELD

This specification relates to systems and devices for controlling a light source, and in particular to light switch systems and devices.

BACKGROUND

Electrically powered light sources may be used to illuminate indoor or outdoor spaces. Light switches may be used to turn a light source on to provide illumination, or to turn off the light source when electrical illumination is not needed.

BRIEF DESCRIPTION OF THE DRAWINGS

Examples of the present invention will now be described with reference to the attached Figures, wherein.

DETAILED DESCRIPTION

In addition to turning a light source on and off, light switch systems and devices may provide additional functionality or connectivity. Such light switch systems and devices may also be referred to as smart light switch systems and devices. In this description, smart light switch systems and devices may interchangeably be referred to simply as switches. Such switches may be communicatively coupled to other networks such as wired or wireless networks, and to devices such as sensors, smart thermostats, mobile devices such as smartphones and tablets, and the like. In addition, such switches may provide additional functionality such as storing power, providing microphone and speaker functionality, providing input or output interface functionality, and the like. Such additional functionality and connectively may also use electrical power.

In order to power the additional functionality or connectivity, the switch may divert power from the light source controlled by the switch. Both the amount of power diverted, and the manner in which the power is diverted, may alter the light output of the light source. This alteration may appear as lighting aberrations or artifacts to occupants of the space being serviced by the light source. In order to minimize lighting artifacts noticeable by the occupants while diverting increased quantities of power from the light source to power additional functionality and connectively, the switch may use an occupancy sensor. The occupancy sensor in turn may allow the switch to determine whether the space being serviced is occupied and then to adjust the manner or amount of power diverted based on whether there are occupants in the space to notice and potentially be affected by the lighting artifacts. In other words, when the space is not occupied, more power may be diverted and the resulting increased lighting artifacts may be tolerated because there are no occupants in the space to be affected by the lighting artifacts.

Figure 1:
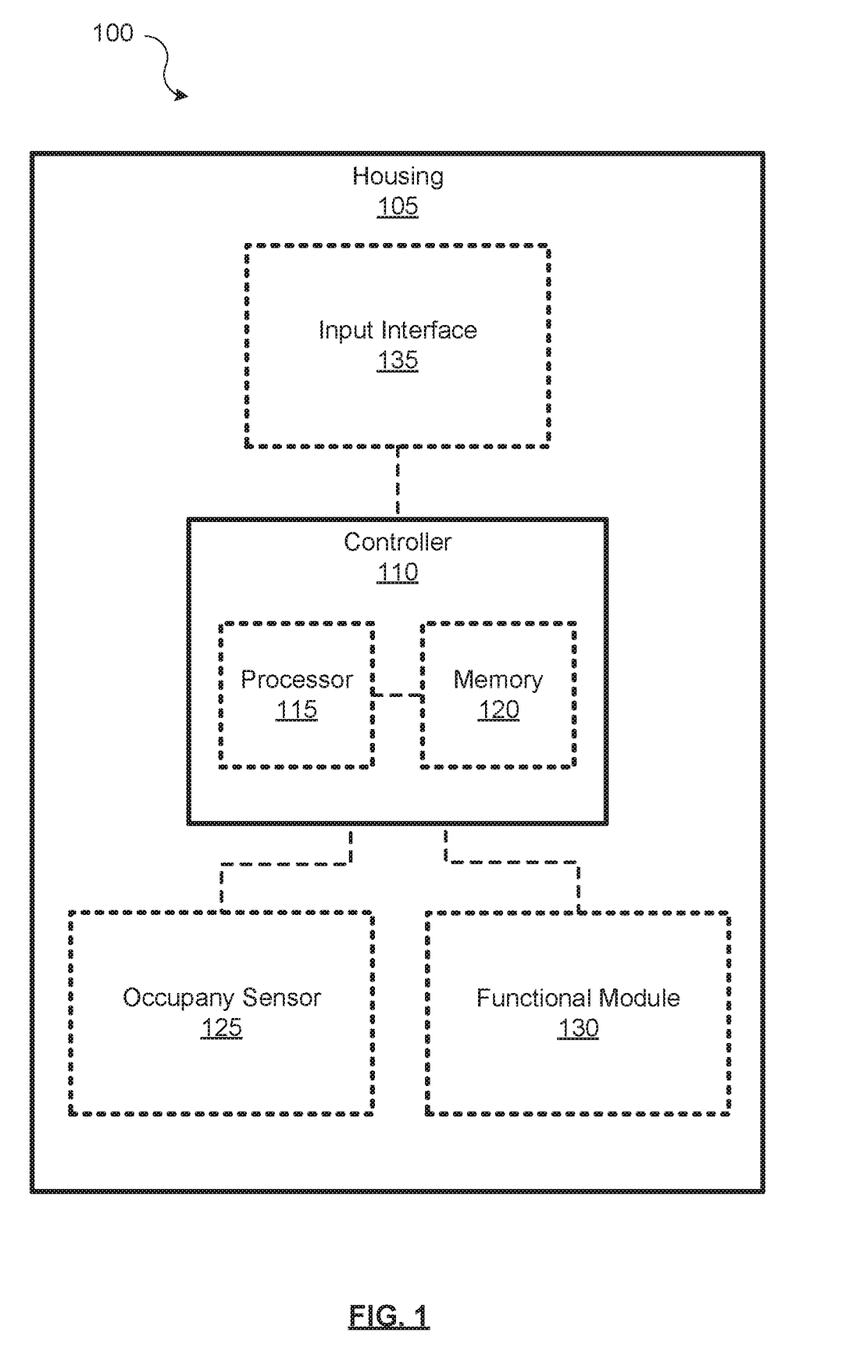
FIG. 1 shows a schematic representation of an example light switch system.

FIG. 1 shows a schematic representation of an example light switch system 100, which may be used to divert power from a light source based on occupancy. Light switch system 100 comprises a housing 105 and a controller 110 secured to housing 105. Controller 110 may be partially or fully received inside housing 105, or may be secured to the inside or outside of housing 105. In some examples, controller 110 may comprise a processor 115 in communication with a memory 120. Processor 115 may comprise a microcontroller, a microprocessor, a processing core, a field-programmable gate array (FPGA), an application-specific integrated circuit (ASIC), a central processing unit (CPU), a graphics processing unit (GPU), and the like. Memory 120 may comprise non-volatile random access memory (RAM), read-only memory (ROM), electrically-erasable programmable read-only memory (EEPROM), flash memory, and the like.

In FIG. 1 processor 115 and memory 120 are depicted in dashed lines to indicate that in some examples the processor and the memory need not be physically located or co-located in controller 110 or in housing 105, and that the functionality provided by processor 115 and memory 120 may be performed by other physical components and then provided to controller 110. Moreover, in some examples the functionality of processor 115, memory 120, or both may be provided by circuits, such as printed circuits, integrated circuits, and the like.

Controller 110 is to control a light source to generate a light output based on a demanded output. Controlling the light source may comprise controlling the current or voltage received by the light source, in order to control characteristics of the light output such as its on/off state, brightness/dimming level, frequency or flicker rate, and the like. The demanded output may comprise an input received from a source external to the light switch system 100, such as input from an operator, input from a smart thermostat, and the like. In some examples, the demanded output may comprise a pre-set value programmed or stored into light switch system 100.

The light source may illuminate an operational volume. The operational volume may comprise part of or all of an indoor or outdoor space. For example, the operational volume may comprise a part of or of all of the space in a room within a building.

The light switch system 100 may also comprise an occupancy sensor 125 communicatively coupled to controller 110. In FIG. 1 occupancy sensor 125 is depicted in dashed line to indicate that while in some examples occupancy sensor 125 may be onboard and secured to housing 105, in other examples occupancy sensor 125 may be remote from housing 105 or controller 110, and in wired or wireless communication with controller 110. Moreover, in some examples the occupancy sensor need not form a part of light switch system 100, and controller 110 may simply receive as an input an occupancy indicator generated by an occupancy sensor that is external to light switch system 100.

Occupancy sensor 125 may generate an occupancy indicator to indicate whether the operational volume is occupied. The occupancy indicator may be the output of occupancy sensor 125, which output may comprise an electrical signal, an optical signal, a magnetic signal, an acoustic signal, and the like. In some examples, when light switch system 100 is installed in a space such as a room, the operational volume may be defined as the portion of the space that is within the operational range or the field of view of occupancy sensor 125. In some examples, occupancy sensor 125 may comprise multiple sensors that have complementary or additive sensing capabilities or operational ranges, to better cover the space in which the sensors operate.

In some examples, occupancy sensor 125 may comprise an infrared (IR)-based sensor or a motion-based sensor. An IR-based sensor may use an IR detector to sense presence of warm bodies in the space, such as bodies of humans, and the like. A motion-based sensor may use sensors that are triggered by moving objects, or may emit electromagnetic or acoustic radiation and detect changes in the reflected echoes to detect motion. Other suitable types or methods of occupancy sensing are also contemplated.

Moreover, light switch system 100 may comprise a functional module 130, which may be communicatively coupled to controller 110. In FIG. 1 functional module 130 is depicted in dashed lines to indicate that while in some examples functional module 130 may be onboard and secured to housing 105, in other examples functional module 130 may be remote from housing 105 or controller 110, and in wired or wireless communication with controller 110. Furthermore, in some examples the functional module need not form a part of light switch system 100, and light switch system 100 or controller 110 may simply be communicatively coupled to a functional module that is external to light switch system 100.

Functional module 130 many comprise one or multiple modules which provide connectivity or functionality beyond turning the light source on and off. For example, functional module 130 may comprise wired or wireless communication or network interfaces, transmitters, or receivers that light switch system 100 may use to communicate with other networks or with other devices such as smart thermostats and smartphones.

Moreover, functional module 130 may comprise a speaker or a microphone that may allow light switch system 100 to receive voice commands and provide audio output. The presence of such a functional module may provide "smart speaker" functionality to light switch system 100. Furthermore, functional module 130 may comprise output interfaces such as displays, visual indicators such light sources, sound generators, and the like, and input interfaces such as dimmer knobs, sliders, touch screens, buttons, and the like.

In some examples, functional module 130 may comprise a power storage module such as a battery or a capacitor. Controller 110 may divert power from the light source to charge these power storage modules to act as back-up power in case of a power outage. In addition, such power storage modules may also provide some backup power to the light source or to other components of light switch system 100 when controller 110 diverts some of the incoming power to other functional modules.

To increase the power available to functional module 130 while also reducing lighting artifacts or alterations visible or noticeable to occupants, controller 110 may divert power from the light source to functional module 130 by controlling the light source to alter the light output to produce an altered light output based on the occupancy indicator. Controller 110 may use the occupancy indicator to detect when the operational volume is unoccupied, at which time more power may be diverted from the light source to functional module 130 and the corresponding increase in lighting alterations or artifacts may be tolerated because the operational volume is not occupied. The diversion of power by controller 110 from the light source to functional module 130 is described in greater detail below.

In addition, light switch system 100 may comprise an input interface 135, which may be communicatively coupled to controller 110. In FIG. 1 input interface 135 is depicted in dashed lines to indicate that while in some examples input interface 135 may be onboard and secured to housing 105, in other examples input interface 135 may be remote from housing 105 or controller 110, and in wired or wireless communication with controller 110.

Input interface 135 may receive the demanded output based on which controller 110 controls the light source. In some examples, input interface 135 may comprise a dimming knob. Moreover, in some examples, input interface 135 may comprise a slider, a button, a display, a touchscreen, and the like.

It is contemplated that in some examples light switch system 100 need not comprise input interface 135. In such examples, controller 110 may receive its operating input, including the demanded output, from other external sources such as a smart thermostat, a smartphone or tablet operated by an operator, and the like.

Figure 2:
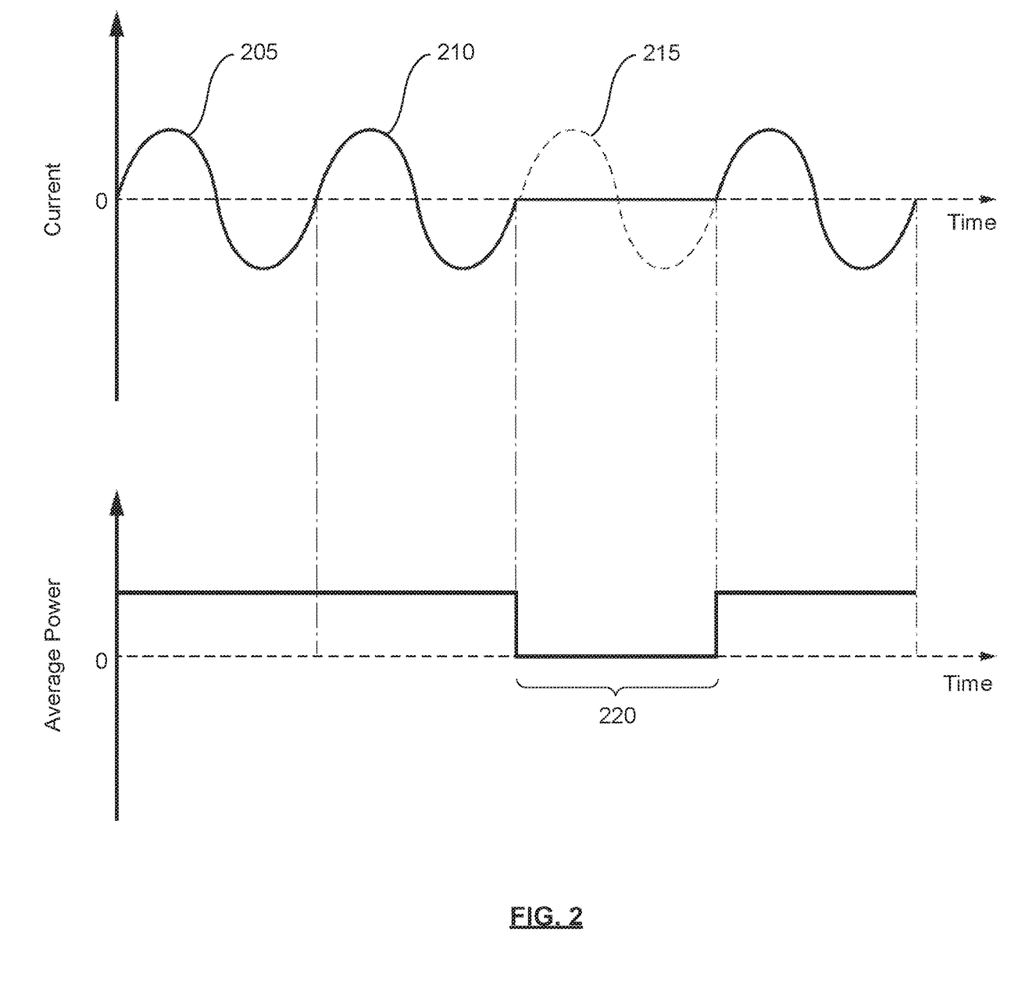
FIG. 2 shows example plots of current and power as a function of time.

Turning now to the diversion of power by controller 110 from the light source to functional module 130, controller 110 may use one or more schemes for such diversion of power. For example, in a first scheme, light switch system 100 may receive alternating current (AC) power to operate the light source, and controller 110 may divert one out of a set of n cycles of the AC power from the light source. Controller 110 may direct the diverted cycles to functional module 130. In some examples, controller 110 may divert one out of every n cycles of the AC power from the light source, and may direct the diverted cycles to functional module 130. FIG. 2 represents such a scheme, where n is equal to three.

The top plot in FIG. 2 shows four cycles of an AC current as a function of time, and the bottom plot in FIG. 2 shows the average power delivered by controller 110 to the light source plotted on the same time scale. Whereas the first and second cycles 205, 210 of the AC current are directed by controller 110 to the light source, the third cycle 215 is diverted away from the light source and may be directed towards functional module 130. In some examples, controller 110 may divert every third cycle of the AC power away the light source.

As shown in FIG. 2, when the third cycle 215 is diverted away from the light source, the power delivered to the light source goes to zero for the duration 220 of the third cycle 215, and the light source will be off during the time duration 220. This in turn, causes the light source to be dimmer on average, and also to flicker. If the magnitude of the diming is sufficiently large, or depending on the duration and frequency of the flicker, the dimming or flicker may become detectable as lighting artifacts to human occupants of the operational volume. In other words, by diverting power from the light source to functional module 130, controller 110 causes the light source to produce an altered light output compared to the situation where no power is diverted from the light source.

Controller 110 may use the occupancy indicator to determine whether the operational volume is occupied, and therefore the amount of lighting artifacts that may be tolerable or permissible. In other words, if the operational volume is not occupied, then no occupants will be affected by the lighting artifacts, a higher level or magnitude of lighting artifacts may be permissible, and more power may be diverted from the light source to functional module 130 even though this diversion may cause a higher level or magnitude of lighting artifacts.

Figure 3:
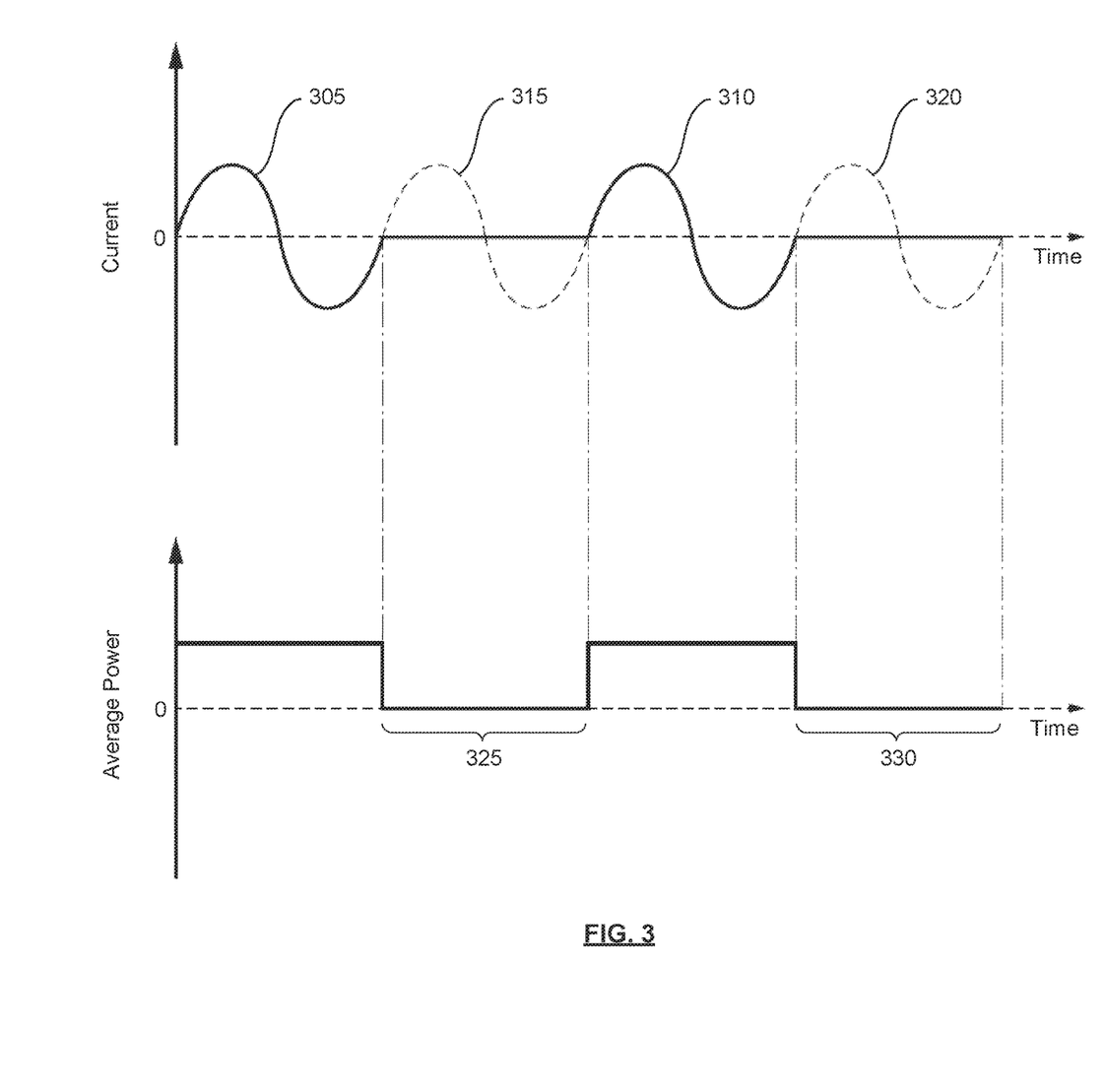
FIG. 3 shows other example plots of current and power as a function of time.

Turning now to FIG. 3, plots of current and power as a function of time are shown, similar to FIG. 2. The difference between FIGS. 2 and 3 is that FIG. 3 shows the case where n is equal to two. In FIG. 3, cycles 305 and 310 are directed to the light source, whereas cycles 315 and 320 are diverted away from the light source and may be directed to functional module 130. In some examples, every second cycle of the AC current may be diverted away from the light source.

When cycles 315 and 320 are diverted away from the light source, the power going to the light source during time durations 325 and 330 may drop to zero, which will cause the light source to turn off during time durations 325 and 330. This in turn, causes the light source to be dimmer on average, and also to flicker. Moreover, the dimming when n=2 will be greater than the dimming when n=3, and the flicker may be noticeable to humans to a different extent.

In some examples, controller 110 may use a first value for n if the occupancy indicator indicates that the operational volume is not occupied, and may use a second value for n if the occupancy indicator indicates that the operational volume is occupied. Moreover, in some examples, the first value of n may be smaller than the second value of n. For example, controller 110 may use n=3 when the operational volume is occupied and use n=2 when the operational volume is not occupied. As described above in relation to FIGS. 2 and 3, decreasing n increases the amount of power diverted from the light source and also increases the dimming of the light source as a result of this diversion. When the operational volume is not occupied, more power may be diverted from the light source and more lighting artifacts (e.g. greater dimming) may be tolerated since there are no occupants in the operational volume to be affected by the increased lighting artifacts.

Moreover, in some examples controller 110 may detect a change in the occupancy indicator to indicate a change in whether the operational volume is occupied. In repose, controller 110 may reduce n if the occupancy indicator indicates that the operational volume has changed from being occupied to being unoccupied, and may increase n if the occupancy indicator indicates that the operational volume has changed from being unoccupied to being occupied. In this manner, controller 110 may dynamically respond to changes in the occupancy of the operational volume, and adjust n accordingly to optimize (e.g. increase) the power diverted from the light source while at the same time controlling or minimizing potential impacts on the occupants of the operational volume caused by the lighting artifacts that accompany diversion of power from the light source.

In some examples, n may comprise a whole number, such as 60, 25, and the like. In other examples, n may comprise a rational number, or a fraction having a whole number numerator and a whole number denominator.

Figure 4:
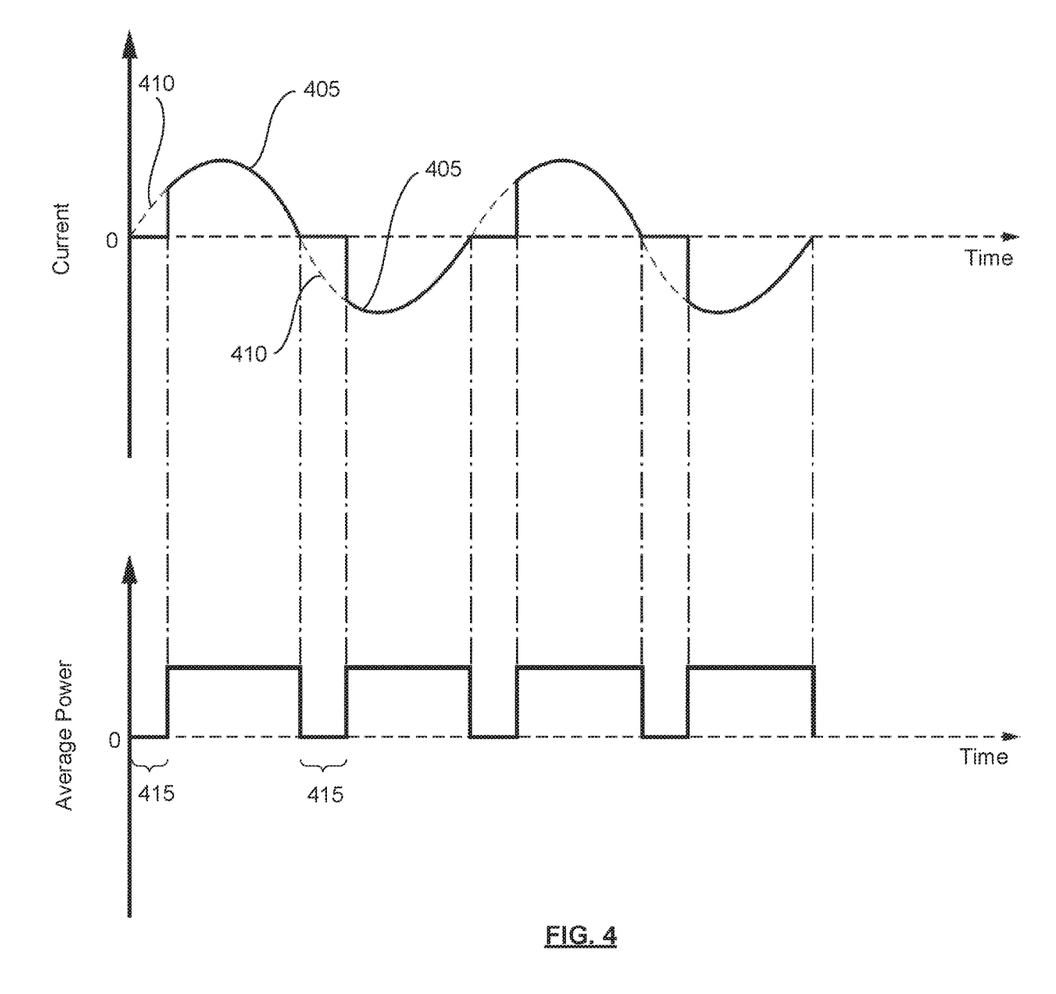
FIG. 4 shows yet other example plots of current and power as a function time.

Controller 110 may also implement a second scheme for diverting power from the light source to functional module 130. In the second scheme, light switch system 100 may receive AC power to operate the light source, and controller 110 may use a first portion of a given cycle of the AC power to power the light source and to divert a second portion of the given cycle to functional module 130. FIG. 4 represents such a scheme.

The top plot in FIG. 4 shows two cycles of an AC current as a function of time, and the bottom plot in FIG. 4 shows the average power delivered by controller 110 to the light source plotted on the same time scale. As shown in FIG. 4, a first portion 405 of the first cycle of the AC current is directed to the light source, whereas a second portion 410 is diverted away from the light source and may be directed towards functional module 130. Directing portion 410 away from the light source may cause power delivered to the light source to go to zero in time durations 415, which will in turn cause the light source to turn off during time durations 415. As a result, the light source may appear dimmer on average and may also flicker.

Figure 5:
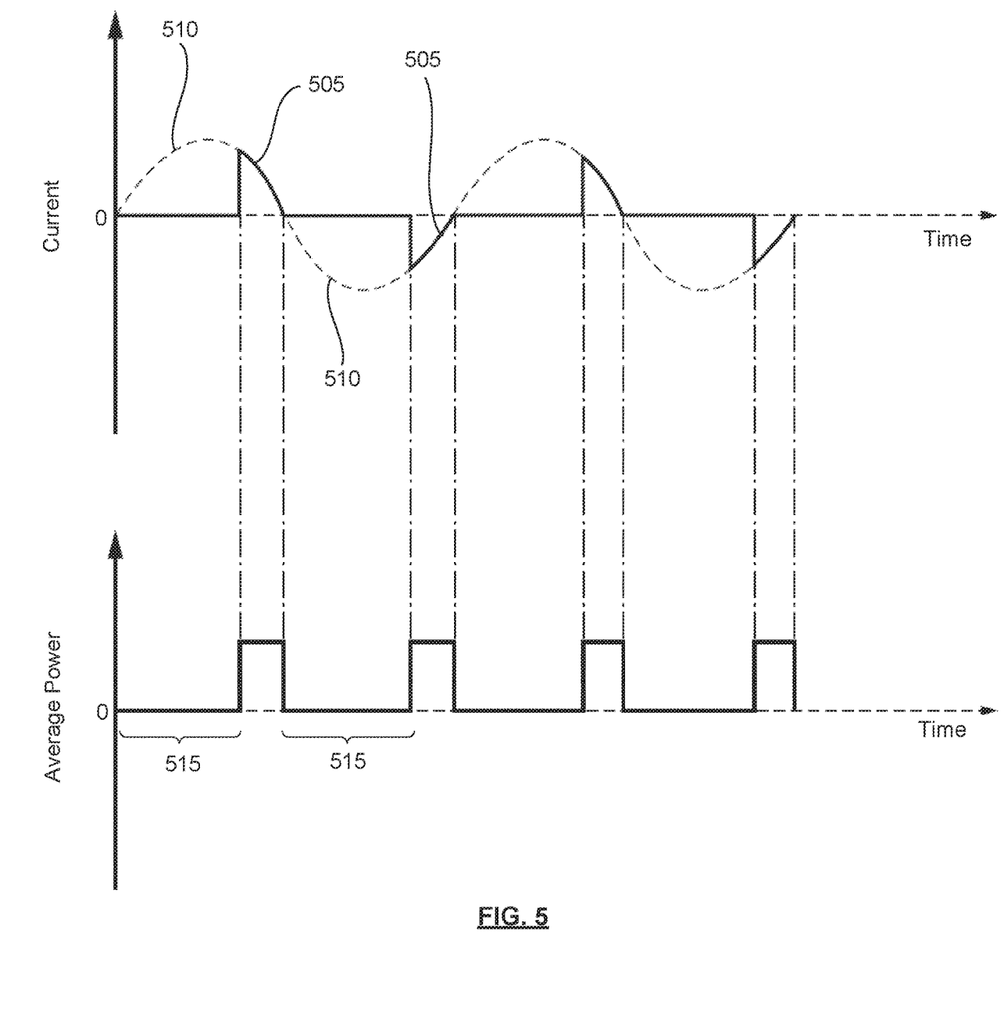
FIG. 5 shows yet other example plots of current and power as a function of time.

Turning now to FIG. 5, plots of current and power as a function of time are shown, similar to FIG. 4. The difference between FIGS. 4 and 5 is that FIG. 5 shows a first portion 505 which is reduced compared to first portion 405, and a second portion 510 which is increased compared to second portion 410. Since first and second portions 505 and 510 are altered compared to first and second portions 405 and 410, first and second portions 505 and 510 may be referred to as an altered first portion and an altered second portion respectively.

First portion 505 is directed to the light source, whereas second portion 510 may be diverted away from the light source and directed to functional module 130. Diverting second portion 510 away from the light source may cause power delivered to the light source to go to zero in time durations 515, which will cause the light source to be off during time durations 515. As time durations 515 are longer than time durations 415, the light source will appear dimmer when powered according to FIG. 5 compared to powering the light source according to FIG. 4.

In some examples, if the occupancy indicator indicates that the operational volume is not occupied, controller 110 may select the first portion and the second portion to obtain a first ratio of a power associated with the first portion to a power associated with the second portion. If, on the other hand, the occupancy indicator indicates that the operational volume is occupied, controller 110 may select an altered first portion and an altered second portion to obtain a second ratio of the power associated with the altered first portion to the power associated with the altered second portion. The area under the first portion and the second portion of the current-versus-time plot may provide a representation of the power associated with the first and second portions.

By altering the first and second portions to adjust the ratio of the power associated with the first and second portions, controller 110 may adjust the amount of power diverted from the light source based on the occupancy indicator. In some examples, controller 110 may alter the first and second portions, based on the occupancy indicator, to set the first ratio to be smaller than the second ratio. In this example, when the operational volume is not occupied, controller 110 may select or set a relatively smaller ratio of the power associated with the first portion to the power associated with the second portion. In this manner, more power is diverted from the light source and the corresponding increased dimming of the light source may be tolerable because the operational volume is unoccupied.

On the other hand, when the operational volume is occupied, controller 110 may select an altered first portion and an altered second portion to set a relatively larger second ratio of the power associated with the first portion to the power associated with the second portion. In this manner, relatively less power is diverted from the light source which reduces the corresponding dimming of the light source, which dimming could potentially be noticeable to and affect the occupants of the operational volume. For example, portions 505 and 510 shown in FIG. 5, and the power associated with them, may yield the first ratio, and portions 405 and 410 shown in FIG. 4, and the power associated with them, may yield the second ratio, where the first ratio is smaller than the second ratio.

As discussed above, FIGS. 4 and 5 show the plot of the current and the power delivered to the light source. As such, when power is diverted from the light source, for example during second portions 410 and 510, both the current and the power are shown as zero in FIGS. 4 and 5. However, the discussion of the power associated with the first and second portions, and their ratio, is based on the original AC power cycles. In other words, for determining the power associated with second portions 410 and 510, the dashed portion of the current-versus-time plot should be used, in which case the magnitude of the area under these dashed second portions will be non-zero.

Furthermore, in some examples controller 110 may detect a change in the occupancy indicator which may indicate a change in whether the operational volume is occupied. In response to the change in the occupancy indicator, controller 110 may change the first portion and the second portion to change the ratio of the power associated with the first portion to the power associated with the second portion. In this manner, controller 110 may dynamically respond to changes in the occupancy of the operational volume by adjusting the first and second portions, and the ratio of the power associated with them.

In some examples, controller 110 may change the first portion (used to power the light source) and the second portion (diverted from the light source) to reduce the ratio of the power associated with the first portion to the power associated with the second portion when the occupancy indicator indicates that the operational volume has changed from being occupied to being unoccupied. In this manner, controller 110 may increase the amount of power diverted from the light source to functional module 130, and the corresponding increased lighting artifacts (e.g. increased dimming) may be tolerable because there are no occupants in the operational volume to be affected by the lighting artifacts.

On the other hand, controller 110 may change the first portion and the second portion to increase the ratio if the occupancy indicator indicates that the operational volume has changed from being unoccupied to being occupied. In this manner, controller 110 my decrease the power diverted from the light source and thereby reduce the lighting artifacts that may be noticeable to or otherwise affect the occupants of the operational volume.

Moreover, in some examples, controller 110 may choose between the first and second schemes for diverting power from the light source. In some examples, to assist with this choice, controller 110 may determine a brightness level, which may for example be determined by comparing the demanded output to a maximum demandable output for the light source. In some examples, the demanded output may comprise the brightness/dimming level set at light switch system 100 (or otherwise provided to light switch system 100), and the maximum demandable output may comprise the maximum brightness (and minimum dimming) settable by the light switch system 100 for the light source.

If the brightness level is above a given threshold, controller 110 may implement the first scheme, and if the brightness level is below the given threshold, controller 110 may implement the second scheme. When the brightness level is relatively high and above the threshold, the power associated with the second portions (see e.g. portion 410 shown in FIG. 4) may not be sufficient to power functional module 130. In such a case, controller 110 may choose the first scheme, in which whole cycles of the AC power are diverted from the light source to functional module 130. If, on the other hand, the brightness level is relatively low and below the threshold, the power associated with the second portions (see e.g. portions 510 shown in FIG. 5) may be sufficient to power functional module 130. In this case, controller 110 may choose the second scheme, in which only a portion of a given cycle of the AC power is diverted from the light source to functional module 130.

In addition, in some examples controller 110 may determine the brightness level by calculating a ratio of the demanded output to the maximum demandable output for the light source, and set the threshold for the brightness level at about 0.5. In other examples, the threshold may be set at about 0.7. Moreover, it is contemplated that in some examples the first and second schemes may be combined or implemented at the same time.

The above description outlines two schemes for diverting power from the light source to the functional module. These two schemes involve diverting power from a light source that is in the on state, which diversion in turn causes changes to the light output of the light source, such as dimming and flickering. It is also contemplated that in some examples other schemes may be used to divert power from the light source or to direct power to the functional modules. For example, power may be directed to the functional modules when the light source is in the off state. This, in turn, may cause lighting artifacts involving turning the light source on when it should otherwise be in the off state, such as ghosting and the like. In such examples, the controller may similarly use the occupancy indictor to determine the amount of power that may be directed to the functional module and the corresponding level of lighting artifacts that may be tolerated based on whether there are occupants in the operational volume who may notice or be affected by the lighting artifacts.

As discussed above, in some examples the components of light switch system 100 may be onboard or secured to housing 105. For example, controller 110, occupancy sensor 125, functional module 130, and input interface 135 may be secured to housing 105 or otherwise incorporated into one device. In such examples, light switch system 100 may also be referred to as a light switch device. In other examples where one or more components of light switch system 100 may be remote or displaced from housing 105, while being communicatively coupled to controller 110, the descriptor "system" may be applied to light switch system 100.

Figure 6:
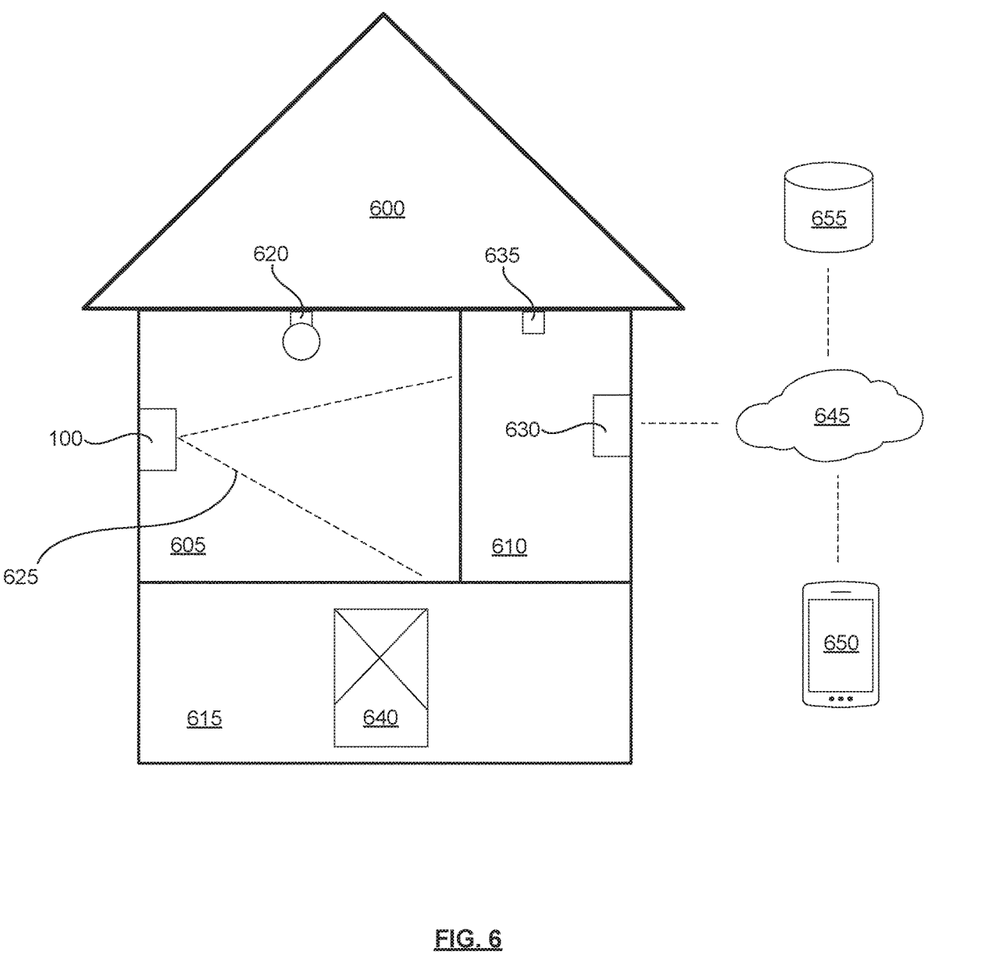
FIG. 6 shows a schematic representation of an example building.

Turning now to FIG. 6, a schematic representation of an example building 600 is shown. Building 600 may comprise spaces or rooms 605 and 610 and a basement 615. Building 600 and its rooms are shown schematically and in a cross-sectional side elevation view. Light switch system 100 may be installed in room 605 to control light source 620. Light source 620 may comprise a light emitting diode (LED) light source, an incandescent light source, or other types of light source. In some examples, light switch system 100 may be used to control multiple light sources.

Light switch system 100 may comprise an occupancy sensor which has a field of view or operational range 625, which in turn defines the operational volume of light switch system 100. In some examples, the operational volume may be the same as operational range 625. Light switch system 100 may comprise functional modules such as speakers, microphones, or network interfaces, and may divert power from light source 620 to power these functional modules.

Light switch system 100 may use the occupancy indicator generated by its occupancy sensor to determine whether the operational volume is occupied. When the operational volume is not occupied, light switch system 100 may divert more power away from light source 620 since the corresponding increase in artifacts and aberrations in the light generated by light source 620 do not affect any occupants in the operational volume, and as such may be tolerated.

In addition, a smart thermostat 630 may also be installed in building 600. Thermostat 630 may be in communication with a climate control unit 640 and a sensor 635. Climate control unit 640 may comprise a furnace, an air conditioner, a humidifier, a dehumidifier, an air filter, and the like. Sensor 635 may comprise a light sensor, a temperature sensor, a humidity sensor, an occupancy sensor, a sound sensor or microphone, and the like. Thermostat 630 may also be in communication with light switch system 100 to share data with or control light switch system 100.

Furthermore, light switch system 100 and thermostat 630 may be able to connect with network 645, and to other devices such as a smartphone 650 via network 645. An operator may use smartphone 650 to control thermostat 630 or light switch system 100. FIG. 6 shows a connection between network 645 and thermostat 630. It is contemplated that light switch system 100 may connect with network 645 either directly or through thermostat 630. In addition, light switch system 100 and thermostat 630 may be able to connect with other sources of data such as database 655 via network 645. Database 655 may store data that may be used by thermostat 630 and light switch system 100, such as current weather data, predicted future weather data, calendar data, sunset and sunrise time data, and the like.

Figure 7:
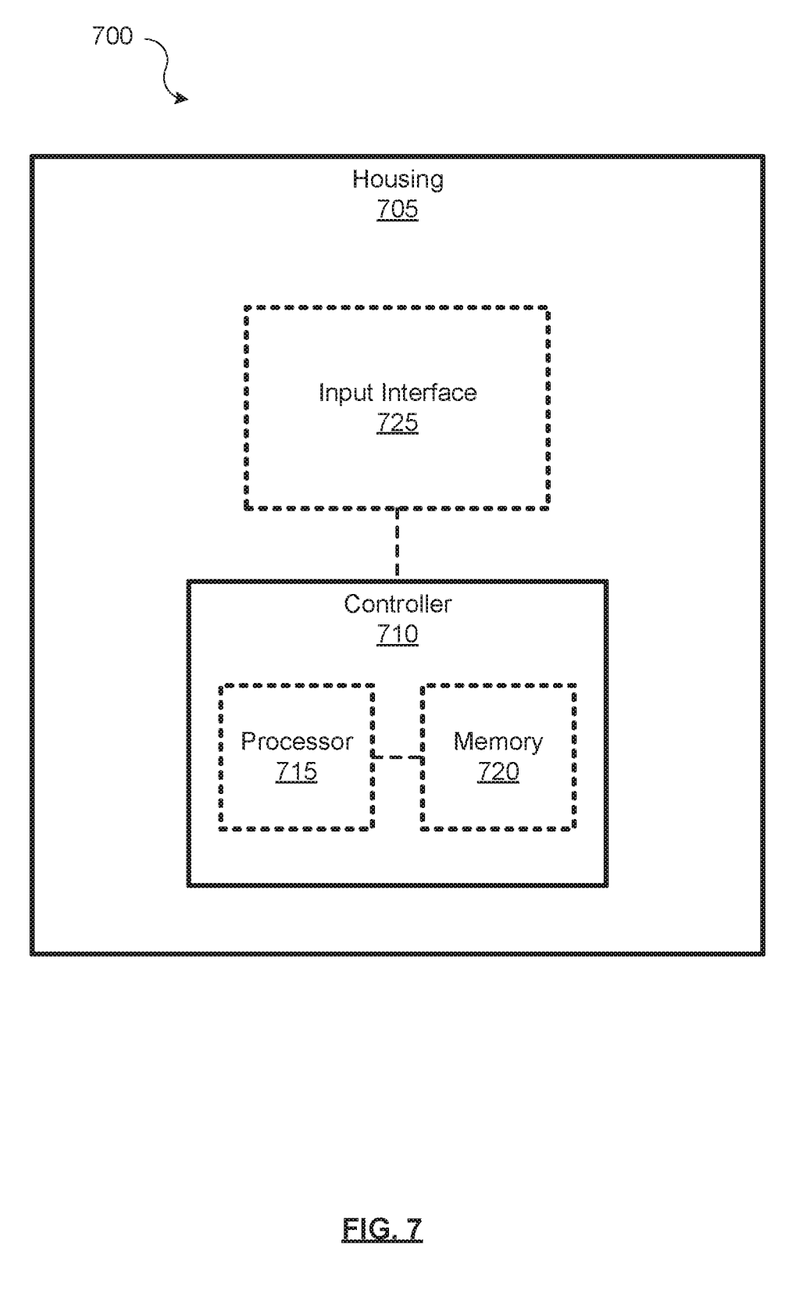
FIG. 7 shows a schematic representation of another example light switch system.

Turning now to FIG. 7, a schematic representation of another example light switch system 700 is shown. Light switch system 700 comprises a housing 705 and a controller 710 secured to housing 705. Controller 710 may be partially or fully received inside housing 705, or may be secured to the inside or outside of housing 705. In some examples, controller 710 may comprise a processor 715 in communication with a memory 720. Housing 705, processor 715, and memory 720 may be similar in structure and function to housing 105, processor 115, and memory 120.

Processor 715 and memory 720 are depicted in dashed lines to indicate that the processor and the memory need not be physically located or co-located in controller 710 or in housing 705, and that the functionality provided by processor 715 and memory 720 may be performed by other physical components and then provided to controller 710.

Controller 710 may control a light source to generate a light output based on a demanded output. In addition, light switch system 700 may comprise an input interface 725 to receive the demanded output. Input interface 725 may be communicatively coupled to controller 710. In FIG. 7, input interface 725 is depicted in dashed lines to indicate that while in some examples input interface 725 may be onboard and secured to housing 705, in other examples input interface 725 may be remote from housing 705 or controller 710, and in wired or wireless communication with controller 710.

Input interface 725 may receive the demanded output based on which controller 710 may control the light source. Moreover, controller 710 may determine a type of the light source based on an electrical usage profile of the light source, and may then control the light source based on the type to adjust the light output based on the demanded output.

In some examples, to determine the type of the light source controller 710 may compare the electrical usage profile of the light source against a reference comprising a set of electrical usage profiles associated with corresponding types of light sources. Furthermore, in some examples this reference may be stored in memory 720. In other examples, the reference may be stored in a memory displaced from controller 710, or in a memory displaced from housing 705 and communicatively coupled with controller 710.

Moreover, in some examples the electrical usage profile may comprise one or both of a magnitude of a current drawn by the light source as a function of time, and a sign of the current drawn by the light source as a function of time. Furthermore, in some examples, the electrical usage profile may comprise, instead of or in addition to magnitude and sign of current, other characteristics or qualities of the power or current drawn or used by the light source.

In some examples, input interface 725 may comprise a dimming input interface and the demanded output may comprise a demanded dimming level. Moreover, in some examples input interface 725 may comprise a dimming knob, a slider, a button, a display, a touchscreen, and the like. Furthermore, in some examples adjusting the light output based on the demanded output may comprise dimming the light output based on the demanded dimming level.

In addition, in some examples the type may comprise a first type comprising inductive and resistive electrical loads, and a second type comprising capacitive and resistive electrical loads. An incandescent light bulb is an example of an inductive and resistive electrical load. An LED light source is an example of a capacitive and resistive electrical load.

In some examples, the type may include more detailed information such as the light generation mechanism of the light source (e.g. incandescent, LED, and the like), the make and model of the light source, the operational specifications of the light source, and the like. In order to distinguish between the different types of light sources at a more granular or detailed level, the reference may be selected to have power usage profiles for light sources of different light generation mechanisms, makes, models, operational specifications, and the like. In this manner, comparing the power usage profile of the light source against the reference may be used to determine a type of the light source that includes more detailed information such as the light generation mechanism, make, model, and operational specifications of the light source.

This more detailed type may then be used by controller 710 to determine the manner of controlling the light source. In some examples, determining the manner of controlling the light source may include determining a manner of controlling the brightness or dimming level of the light source (aka, a "dimming strategy").

For example, controller 710 may control a dimming level of the light source using a forward-phase, leading-edge dimming if the type comprises the first type, and may control a dimming level of the light source using a reverse-phase, trailing-edge dimming if the type comprises the second type.

Figure 8:
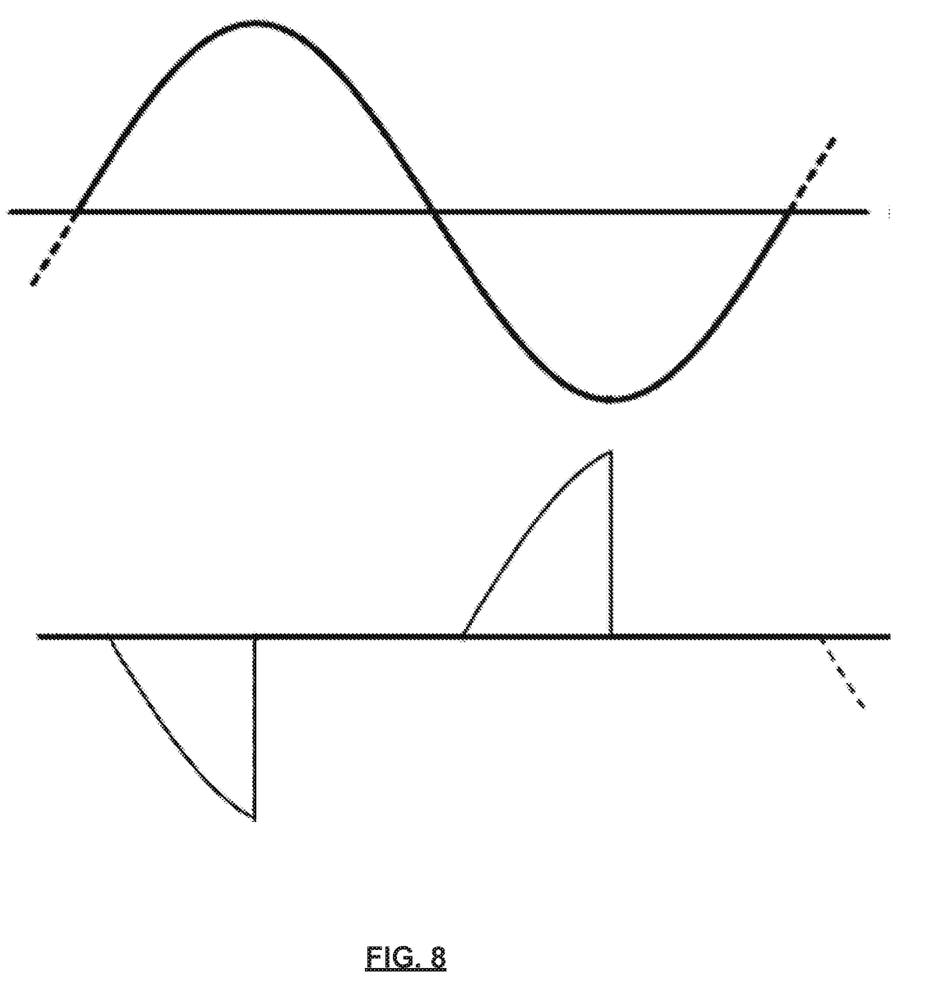
FIG. 8 shows example plots of current as a function of time.

FIG. 8 shows an example of a current profile i.e. current versus time) used for forward-phase, leading-edge dimming.

The top plot in FIG. 8 shows a cycle of the AC current that may be used to power the light source. In order to effect dimming, portions of the cycle may be diverted away from the light source. The bottom plot in FIG. 8 shows the portions of the cycle that are used to power the light source in the dimming state, as indicated by the θ.

Figure 9:
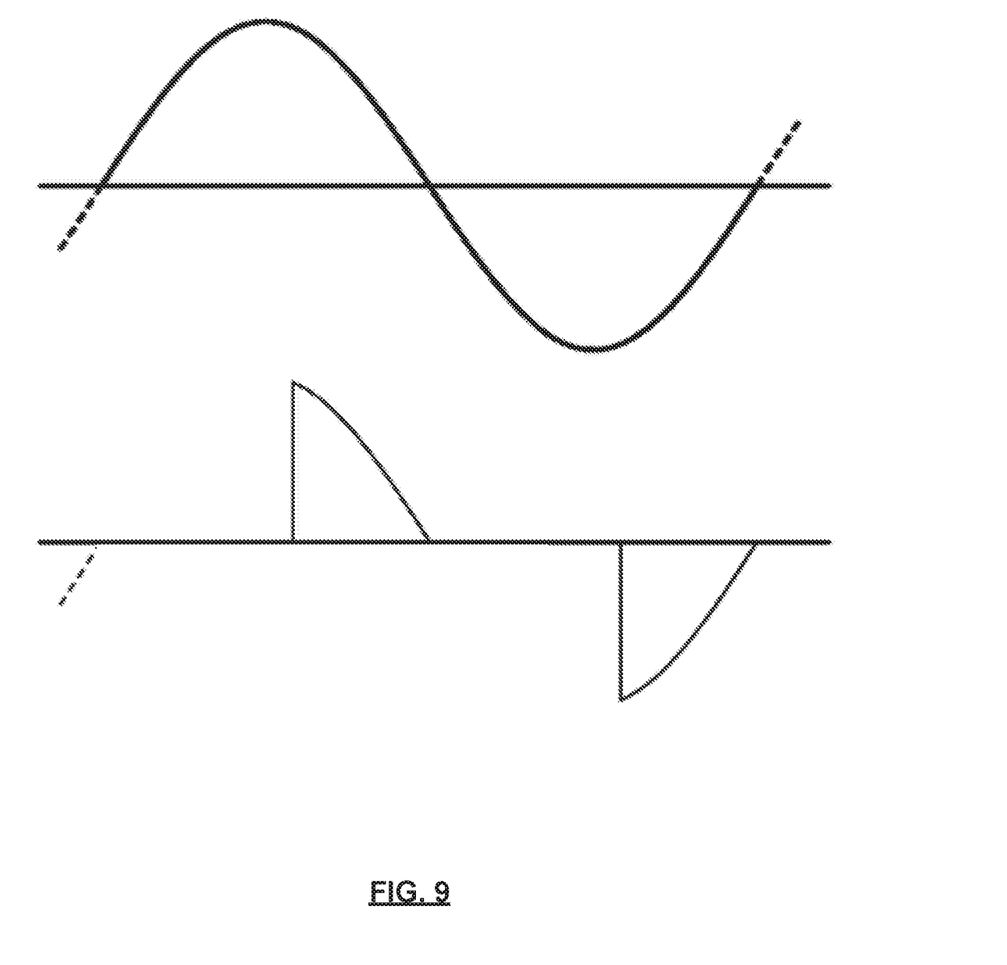
FIG. 9 shows other example plots of current as a function of time.

FIG. 9 in turn shows an example of a current profile (i.e. current versus time) used for reverse-phase, trailing-edge dimming. The top plot in FIG. 9 shows a cycle of the AC current that may be used to power the light source. In order to effect dimming, portions of the cycle may be diverted away from the light source. The bottom plot in FIG. 9 shows the portions of the cycle that are used to power the light source in the dimming state, as indicated by the θ.

In some examples, light switch system 700 may comprise an occupancy sensor and a functional module similar to occupancy sensor 125 and functional module 130 of light switch system 100. In these examples, controller 710 may also have the features and perform the functionality similar to those described herein in relation of controller 110.

Moreover, in some examples light switch system 100 and controller 110 may have the features and perform the functionality described herein in relation to light switch system 700 and controller 710.

In this description some components are described as being communicatively coupled to one another. Communicative coupling may comprise components being connected or connectable together to allow for exchange of data, electrical power, or both. In some examples, communicative coupling may comprise being able to send or receive signals such as electrical signals, optical signals, and the like. Moreover, in some examples, communicative coupling may comprise being connected by wireless connections, by wired connections, or both.

The above description describes examples of the present invention, and alterations and modifications may be made thereto, by those of skill in the art, without departing from the scope of the invention which is defined solely by the claims appended hereto.

The invention claimed is:

1. A light switch system comprising:
a housing;
a controller secured to the housing, the controller to control a light source to generate a light output based on a demanded output, the light source to illuminate at least a portion of an operational volume;
an occupancy sensor communicatively coupled to the controller, the occupancy sensor to generate an occupancy indicator to indicate whether the operational volume is occupied; and
a functional module communicatively coupled to the controller;
the controller to divert power from the light source to the functional module by controlling the light source to alter the light output to produce an altered light output based on the occupancy indicator;
wherein:
the light switch system is to receive AC power to operate the light source; and
to divert power from the light source to the functional module the controller is to implement one or more of a first scheme and a second scheme, wherein:
in the first scheme, the controller is to divert one out of every n cycles of the AC power from the light source to the functional module, where n is greater than or equal to two; and
in the second scheme, the controller is to use a first portion of a given cycle of the AC power to power the light source and to divert a second portion of the given cycle to the functional module.

2. The light switch system of claim 1, wherein the controller is further to determine a brightness level by comparing the demanded output to a maximum demandable output for the light source.

3. The light switch system of claim 2, wherein:
if the brightness level is above a given threshold, the controller is to implement the first scheme; and
if the brightness level is below the given threshold, the controller is to implement the second scheme.

4. The light switch system of claim 3, wherein the controller is to determine the brightness level by calculating a ratio of the demanded output to the maximum demandable output for the light source, and the given threshold is about 0.5.

5. The light switch system of claim 3, wherein the controller is to determine the brightness level by calculating a ratio of the demanded output to the maximum demandable output for the light source, and the given threshold is about 0.7.

6. The light switch system of claim 1, wherein the controller is to use a first value for n if the occupancy indicator indicates that the operational volume is not occupied and to use a second value for n if the occupancy indicator indicates that the operational volume is occupied, the first value being smaller than the second value.

7. The light switch system of claim 1, wherein the controller is to:
detect a change in the occupancy indicator to indicate a change in whether the operational volume is occupied; and
reduce n if the occupancy indicator indicates that the operational volume has changed from being occupied to being unoccupied; and
increase n if the occupancy indicator indicates that the operational volume has changed from being unoccupied to being occupied.

8. The light switch system of claim 1, wherein:
if the occupancy indicator indicates that the operational volume is not occupied, the controller is to select the first portion and the second portion to obtain a first ratio of a power associated with the first portion to a power associated with the second portion; and
if the occupancy indicator indicates that the operational volume is occupied, the controller is to select an altered first portion and an altered second portion to obtain a second ratio of the power associated with the altered first portion to the power associated with the altered second portion.

9. The light switch system of claim 8, wherein the first ratio is smaller than the second ratio.

10. The light switch system of claim 1, wherein the controller is to:
detect a change in the occupancy indicator to indicate a change in whether the operational volume is occupied; and
in response to the change in the occupancy indicator, change the first portion and the second portion to change a ratio of a power associated with the first portion to a power associated with the second portion.

11. The light switch system of claim 10, wherein the controller is to:

change the first portion and the second portion to reduce the ratio if the occupancy indicator indicates that the operational volume has changed from being occupied to being unoccupied; and change the first portion and the second portion to increase the ratio if the occupancy indicator indicates that the operational volume has changed from being unoccupied to being occupied.

12. The light switch system of claim 1, wherein the occupancy sensor comprises one or more of an IR-based sensor and a motion-based sensor.

13. The light switch system of claim 1, wherein the occupancy sensor is secured to the housing.

14. The light switch system of claim 1, wherein the functional module comprises one or more of a power storage module, a communication interface, an input interface, a speaker, a microphone, and a visual indicator.

15. The light switch system of claim 1, wherein the functional module is secured to the housing.

* * * * *